(12) United States Patent
Meaney

(10) Patent No.: US 12,430,493 B1
(45) Date of Patent: Sep. 30, 2025

(54) ACTIONS BASED ON LOG PATTERN DETECTION

(71) Applicant: Amazon Technologies, Inc., Seattle, WA (US)

(72) Inventor: Michael Patrick Meaney, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 17/708,918

(22) Filed: Mar. 30, 2022

(51) Int. Cl.
| | |
|---|---|
| *G06F 11/00* | (2006.01) |
| *G06F 3/0482* | (2013.01) |
| *G06F 11/14* | (2006.01) |
| *G06F 18/2413* | (2023.01) |
| *G06F 40/134* | (2020.01) |

(52) U.S. Cl.
CPC .......... *G06F 40/134* (2020.01); *G06F 3/0482* (2013.01); *G06F 11/1471* (2013.01); *G06F 18/2413* (2023.01)

(58) Field of Classification Search
CPC .............. G06F 11/3409; G06F 11/079; G06F 11/3476; G06F 11/3447; G06F 11/0787; G06F 11/0793; G06F 11/147
See application file for complete search history.

(56) References Cited

U.S. PATENT DOCUMENTS

| | | | | |
|---|---|---|---|---|
| 8,312,660 | B1 * | 11/2012 | Fujisaki | F41A 17/08 |
| | | | | 455/457 |
| 11,888,870 | B2 * | 1/2024 | Garyani | H04L 63/1441 |
| 2008/0172574 | A1 * | 7/2008 | Fisher | G06N 5/02 |
| | | | | 714/25 |
| 2012/0066547 | A1 * | 3/2012 | Gilbert | H04L 41/16 |
| | | | | 714/45 |
| 2023/0141807 | A1 * | 5/2023 | Groenewegen | G06F 8/33 |
| | | | | 717/106 |

OTHER PUBLICATIONS

UI ++, Interactive Actions, Feb. 20, 2021, pp. 1-5, http://uiplusplus.configmgrftw.com/docs/actions/interactiveactions.html (Year: 2021).*

* cited by examiner

*Primary Examiner* — Charles Ehne
(74) *Attorney, Agent, or Firm* — BakerHostetler

(57) ABSTRACT

Pattern information and action information may be received from a customer of a monitoring service. The pattern information indicates a data pattern, and the action information indicates that a computer-executed action corresponds to the data pattern. A log may be analyzed, based on the pattern information, to detect one or more text strings within the log that match the data pattern. It may be detected that a first text string of the one or more text strings matches the data pattern. Based at least in part on the action information, the computer-executed action may be associated with the first text string. A selectable control, such as a drop-down menu or hyperlink, may be displayed, for example in the log, that is selectable to trigger the performing of the computer-executed action. The computer-executed action may be performed based on a user-selection provided via the selectable control.

20 Claims, 8 Drawing Sheets

FIG. 2

Log Viewing Application 105

Log 100

Log Entry 101: Any-Text, Any-Text, Any-Text
Log Entry 102: Any-Text, Any-Text, Any-Text
Log Entry 103: Any-Text, Any-Text, Any-Text
Log Entry 104: Any-Text, $AB-1234-ZYX Any-Text Drop-Down Menu 120
(for $AB-1234-ZYX)

111 – Load Resource Information Page
112 – Reboot Resource
113 – Reduce Load on Resource
114 – Allocate Memory to Resource
115 – Allocate Processing to Resource
116 – Execute Serverless Function Log 100

Log Entry 101: Any-Text, Any-Text, Any-Text
Log Entry 102: Any-Text, Any-Text, Any-Text
Log Entry 103: Any-Text, Any-Text, Any-Text
Log Entry 104: Any-Text, $AB-1234-ZYX Any-Text Log Enrichment Components 130

Pattern Information 131
(Pattern = $LL-NNN-LLL)

Action Information 132
(Specifies computer-executed actions for pattern $LL-NNN-LLL)

ACTIONS BASED ON LOG PATTERN DETECTION

BACKGROUND

Computing logs may be generated for a wide variety of purposes. While logs may provide important historical information to users, the logs are typically presented in a plain text format. Information within a log may often trigger users to perform a variety of manual operations. For example, after seeing information about a given resource identified in a log, a user may wish to navigate to an additional information source (e.g., a data store, resource page, etc.) from which the user may obtain, add and/or modify information about the resource. As another example, after seeing information about a given resource identified in a log, a user may wish to perform an action corresponding to the resource, such as an action to correct and/or mitigate an error or other problem indicated by information in the log. Manual performance of these operations may be time-consuming as users may be required to open and switch between multiple different applications and interfaces. Moreover, even when a given user is able to obtain information about a resource in a log, this information may sometimes not be accessible to other users that access the same log, thereby resulting in lost data and potential duplication of work.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 is a diagram illustrating an example action drop down menu for a matched log data pattern that may be used in accordance with the present disclosure.

DETAILED DESCRIPTION

Figure 1:
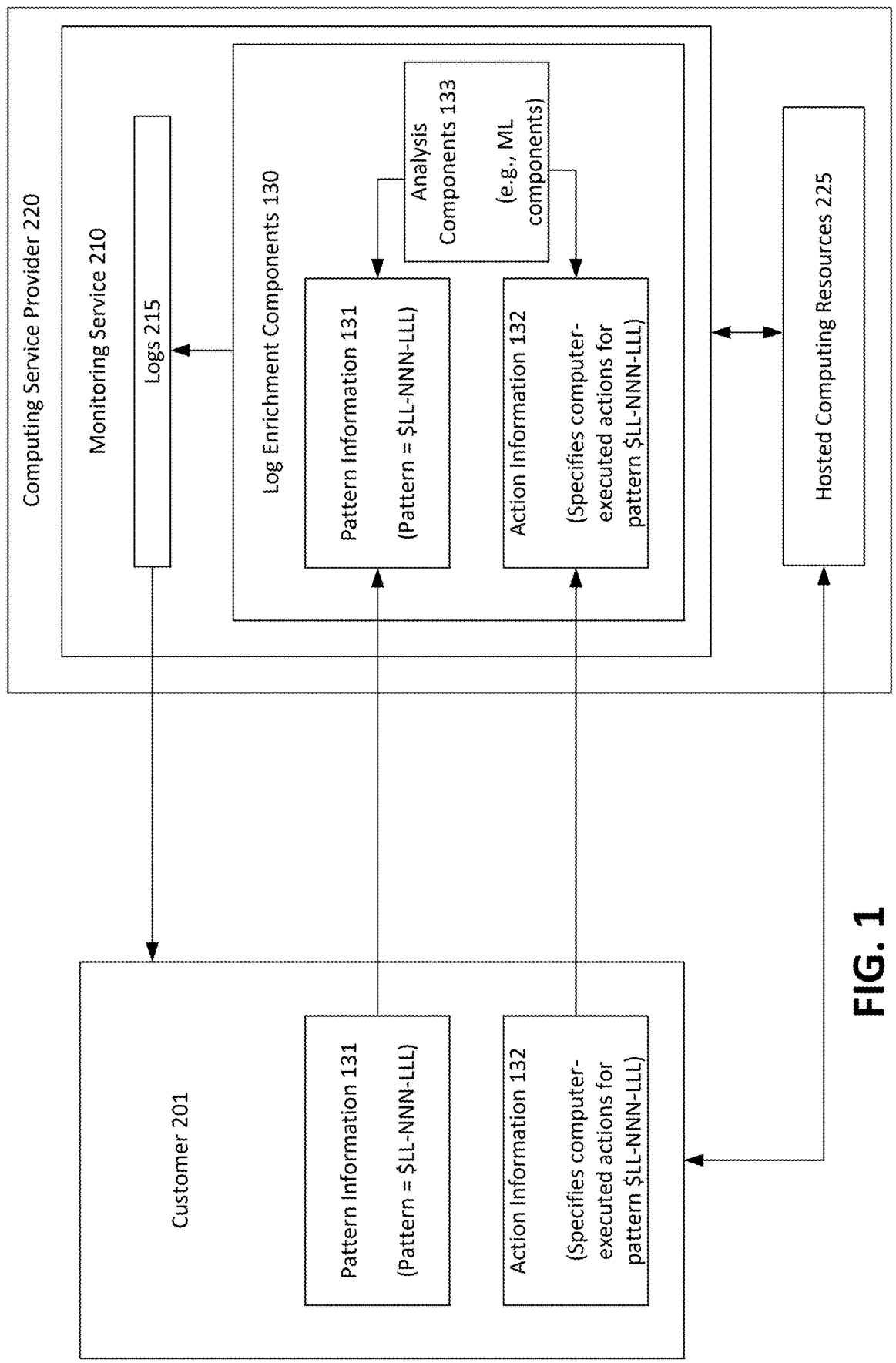
FIG. 1 is a diagram illustrating example customer-provided pattern information and action information that may be used in accordance with the present disclosure.

Techniques for performing actions based on log pattern detection are described herein. In some examples, a computing service provider may operate a monitoring service that monitors customer computing resources, such as customer computing resources that are hosted by the computing service provider. The monitoring service may generate logs, which include data regarding events occurring on, or otherwise in association with, the customer's computing resources. In some examples, the monitoring service may provide a feature to customers whereby the monitoring service detects data patterns within logs, such as within text strings that are included in the logs, and the monitoring service performs specified computer-executed actions based on detected data patterns. Both the data patterns and the respective computer-executed actions may be customer-specific and may be performed based, at least in part, on customer-specific information provided by a given customer. Moreover, the data patterns and associated actions may be stored in a data store associated with the specific customer.

In some examples, a customer may provide, to the monitoring service, pattern information that indicates data patterns that are detectable within a log. For example, the pattern information may include a format of a respective pattern, such as a string length (e.g., specific length or length range), a type (e.g., letter, number, special character, etc.) and position of each character within the string, an indication of any spaces within the string, and the like. For example, for a given character, the pattern information may indicate whether a specific character (e.g., one or more specific letters) or a general character type (e.g., any letter) may be used, along with case information (e.g., upper case, lower case, not case-sensitive, etc.), and the like. In some examples, the pattern information may be used to identify customer-specific patterns that are defined by a specific customer and used for customer-specific purposes. For example, a given customer may use a specific identifier to identify various items that are managed by the customer, such as products, individuals, groups, departments, and the like. In many cases, prior to receipt of the pattern information from a customer, the monitoring service may be unaware of the format of the customer-specific patterns identified within the pattern information for that customer.

Also, in some examples, a customer may provide, to the monitoring service, action information that indicates one or more computer-executed actions associated with a given data pattern. In some examples, the action information may indicate customer-specific actions that are defined by a specific customer and used for customer-specific purposes. Some example computer-executed actions may include accessing a resource associated with a given data pattern, such as a data store or information page associated with a given data pattern. For example, the action information may include a customer-defined format of a uniform resource locator (URL) or other address of the specified resource. The computer-executed actions may also include retrieving information from the accessed resource and displaying the information in the log. As a specific example, upon recognizing a data pattern that is an identifier of a given individual, the monitoring service could access and retrieve additional information about that individual (e.g., email address, membership level, purchase history, etc.) and display the retrieved information in the log, for example adjacent to the detected data pattern. In some examples, this information may be saved in the log and displayed not only to a current user that is currently viewing the log but also to additional users that may view the log subsequent to the current user, without requiring the information to be repeatedly obtained and re-displayed. In some examples, the techniques described herein may be particularly advantageous for assisting less experienced users in processing a log. For example, less experienced users may sometimes be unsure of which actions should be taken in response to given log data- and may also be unsure of how to perform those actions. The techniques described herein may assist in providing indications of available actions and performing those actions. Moreover, by displaying and saving retrieved information in the log, less experienced users may be able to immediately view the retrieved information without requiring the information to be repeatedly obtained and re-displayed.

The computer-executed actions may also include other actions that may be performed on a resource associated with a given data pattern, such as an invocation of a serverless or other computing function. In one specific example, data within the log may be analyzed to determine an error condition associated with a computing resource, and the computer-executed actions may include one or more corrective actions that are employed to assist in resolving the error condition. In some examples, these corrective actions may include rebooting a computing resource, reducing, increasing and/or redistributing a load associated with the computing resource, allocating and/or deallocating other resources (e.g., memory, processing, etc.) to and/or from the computing resource, and the like. In some examples, these and other specified actions may be performed without requiring a user to exit a log viewing application and without requiring the user to open any other additional applications and/or interfaces.

Furthermore, in some examples, the action information may indicate whether a specified action should be performed automatically (e.g., without requesting user input) or in response to user input. For scenarios in which an action is performed based on user input, the action information may also indicate a type of selectable control (e.g., drop-down menu, hyperlink, etc.) via which the user input may be provided. For example, in some cases, for scenarios in which the specified action includes accessing a resource associated with a detected pattern, the text string that includes the detected pattern may be converted to a hyperlink. Clicking-on, or otherwise selecting, the hyperlink may cause the specified resource (e.g., a page or other location associated with the detected pattern) to be accessed, such as via a URL or other address indicated in the action information. In other examples, a drop-down menu may be displayed in the log and/or log viewing application, such as at a location adjacent to the detected pattern. The drop-down menu may indicate respective actions, which are specified in the action information, that may be performed in association with the detected pattern.

In some examples, the monitoring service may analyze a log associated with a customer, to detect data patterns within the log (e.g., text strings included in the contents of the log) that match patterns indicated in the pattern information provided by that customer. When a match is detected, the monitoring service may then, based on the action information provided by that customer, perform one or more respective computer-executed actions corresponding to the matched data pattern. As described above, in some examples, user input may be provided, such as via one or more selectable controls (e.g., drop-down menu, hyperlink, etc.) to trigger performance of the computer-executed actions. In some examples, the monitoring service may insert the selectable controls into the log and/or log-viewing application, such as by adding a drop-down menu or converting a matching text string to a hyperlink as described above.

In some cases, in order to identify a particular entity associated with a matched text string, the monitoring service may analyze additional data included in the same log entry as the matched text string, in another log entry from the same log, in a different log, and/or in other data sources. For example, in some cases, a given text string may match an identifier for a given computing resource. However, in some cases, there may be multiple resources in different computing regions that have the same identifier as one another, and it may be unclear which resource in which region is being referenced in the log. In some examples, the monitoring service may analyze the log to find additional information to identify the referenced resource. For example, in some cases, another log entry might include a text string that indicated a particular region (e.g., Region_East1). Based on this information, the monitoring service may conclude that the referenced computing resource is located in Region_East1. In this scenario, the computer-executed actions may, therefore, be targeted to the particular computing resource in Region_East1 (e.g., as opposed to resources with the same identifier in other regions). For example, the matched text string may be converted to a hyperlink that accesses an information page for the particular computing resource in Region_East1.

FIG. 1 is a diagram illustrating example pattern information 131 and action information 132 that may be used in accordance with the present disclosure. As shown in FIG. 1, computing service provider 220 hosts hosted computing resources 225 on behalf of customer 201. In some examples, the computing service provider 220 may provide a wide variety of computing services, such as web services, cloud computing services, data storage services, electronic marketplace services, remote application management services, identity and access management services and many others. The hosted computing resources 225 may include a wide variety of computing resources, for example including hardware and software resources, virtual machine or other computing instances, databases, memory resources, processing resources, communications resources, applications, web pages, identities, and many others. The computing service provider 220 operates a monitoring service 210 that monitors the hosted computing resources 225 of customer 201 and optionally other customers in a multi-tenant configuration. The monitoring service 210 generates logs 215, which may include data regarding events occurring on, or otherwise in association with, hosted computing resources 225. In this example, the monitoring service 210 executes log enrichment components 130, which may detect data patterns within logs 215, such as within text strings that are included in the logs 215, and the log enrichment components 130 perform specified computer-executed actions based on detected data patterns. Both the data patterns and the respective computer-executed actions may be customer-specific and may be performed based, at least in part, on customer-specific information provided by a given customer (e.g., customer 201).

In the example of FIG. 1, a customer 201 provides, to the log enrichment components 130, pattern information 131 that indicates data patterns that are detectable within logs 215. For example, the pattern information 131 may include a format of a respective pattern, such as a string length (e.g., specific length or length range), a type (e.g., letter, number, special character, etc.) and position of each character within the string, an indication of any spaces within the string, and the like. For example, for a given character, the pattern information may indicate whether a specific character (e.g., one or more specific letters) or a general character type (e.g., any letter) may be used, along with case information (e.g., upper case, lower case, not case-sensitive, etc.), and the like.

In the example of FIG. 1, an example pattern ($LL-NNN-LLL) is shown that may be indicated within pattern information 131. This pattern includes a dollar sign ($), followed by any two uppercase letters (represented by the uppercase letter L), followed by a dash, followed by any three numerical digits (represented by the uppercase letter N), followed by another dash, followed by any three uppercase letters (also represented by the uppercase letter L).

In some examples, the pattern information 131 may be used to identify customer-specific patterns that are defined by customer 201 and used for customer-specific purposes. For example, customer 201 may use a specific identifier to identify various items that are managed by the customer 201, such as products, individuals, groups, departments, and the like. In many cases, prior to receipt of the pattern information 131 from customer 201, the monitoring service 210 may be unaware of the format of the customer-specific patterns identified within the pattern information 131 for customer 201. In some examples, the pattern information 131 and the action information 132 for customer 201 may be stored in a data store associated with the customer 201 and that may include information only for customer 201 and no other customers.

As also shown in FIG. 1, customer 201 may provide, to the log enrichment components 130, action information 132 that indicates one or more computer-executed actions associated with a given data pattern. For example, in FIG. 1, action information 132 may specify one or more computer-executed actions associated with the example data pattern $LL-NNN-LLL. In some examples, the action information 132 may indicate customer-specific actions that are defined by customer 201 and used for customer-specific purposes. Some example computer-executed actions may include accessing a resource associated with a given data pattern, such as a data store or information page associated with a given data pattern. For example, the action information may include a customer-defined format of a URL or other address of the specified resource. The computer-executed actions may also include retrieving information from the accessed resource and displaying the information in a log. The computer-executed actions may also include other actions that may be performed on a resource associated with a given data pattern, such as an invocation of a serverless function (e.g., a customer defined, or selected, serverless function) or other computing function.

Furthermore, in some examples, the action information 132 may indicate whether a specified action should be performed automatically (e.g., without requesting user input) or in response to user input. For scenarios in which an action is performed based on user input, the action information 132 may also indicate a type of selectable control (e.g., drop-down menu, hyperlink, etc.) via which the user input may be provided. For example, in some cases, for scenarios in which the specified action includes accessing a resource associated with a detected pattern, the text string that includes the detected pattern may be converted to a hyperlink. Clicking-on, or otherwise selecting, the hyperlink may cause the specified resource (e.g., a page or other location associated with the detected pattern) to be accessed, such as via a URL or other address indicated in the action information. In other examples, a drop-down menu may be displayed in the log and/or log viewing application, such as at a location adjacent to the detected pattern. The drop-down menu may indicate respective actions, which are specified in the action information, that may be performed in association with the detected pattern.

In the example of FIG. 1, the log enrichment components 130 include analysis components 133, which may be used to assist in generating pattern information 131 and action information 132. Specifically, in some examples, analysis components 133 may analyze the contents of logs 215 as well as actions performed by customer 201 in connection with viewing of logs 215. In some examples, the analysis components 133 may include machine learning (ML) components that may analyze the logs 215 and customer actions using one or more machine learning algorithms and make suggestions and recommendations based on the outputs of these algorithms. For example, the analysis components 133 may analyze logs 215 to determine certain data patterns that frequently appear in the logs 215 or frequently illicit actions by customer 201. In some examples, these data patterns may then optionally be suggested to the customer 201 as potential data patterns for inclusion in the pattern information 131. Additionally, in some examples, the analysis components 133 may analyze the behavior of customer 201 to determine certain actions that customer 201 may frequently perform during, or shortly after, viewing of a log. These actions may then optionally be suggested to the customer 201 as potential actions for inclusion in the action information 132. In yet other examples, customer 201 may, while reviewing logs 215, provide user input to identify various text strings for which the customer 201 would like to add corresponding data patterns to the pattern information 131. In one specific example, the customer 201 could highlight a given text string in a log and then right-click to select an option to have a corresponding data pattern for that text string added to the pattern information 131. For example, the customer 201 may highlight a text string that includes three letters followed by three numbers. The customer 201 may then right-click to have a corresponding data pattern added to the pattern information 131. The analysis components 133 may then recognize that the highlighted text string includes three letters followed by three numbers. A corresponding data pattern including three letters followed by three numbers may then be added to the pattern information 131 or presented to customer 201 for editing and/or approval prior to being added to pattern information 131. In some examples, the data pattern may be suggested by the analysis components 133 based on the highlighted, or otherwise selected, text string and optionally other occurrences of similar patterns in the log. The user may then accept the suggested data pattern and add it to pattern information 131, or the user may optionally modify the suggested data pattern before adding it to pattern information 131. It will be appreciated that, in a multi-tenant environment, each customer of the multi-tenant environment could have respective data pattern information that is specific to that customer stored in a similar fashion.

The log enrichment components 130 may analyze a log associated with customer 201, such as to detect data patterns within the log (e.g., text strings included in the contents of the log) that match patterns indicated in the pattern information 131 provided by customer 201. When a match is detected, the log enrichment components 130 may then, based on the action information 132 provided by customer 201, perform one or more respective computer-executed actions corresponding to the matched data pattern. As described above, in some examples, user input may be provided, such as via one or more selectable controls (e.g., drop-down menu, hyperlink, etc.) to trigger performance of the computer-executed actions. In some examples, the log enrichment components 130 may insert the selectable controls into the log and/or log-viewing application, such as by adding a drop-down menu or converting a matching text string to a hyperlink as described above.

Some specific examples of log enrichment will now be described in detail. Referring now to FIG. 2, an example is shown in which log 100 (which is a specific example of one of logs 215) may be enriched to include a drop-down menu 120 that allows selection of various computer-executed actions. In the example of FIG. 2, log 100 includes log entries 101-104 as well as any number of additional log entries (not shown in FIG. 2). Each log entry 101-104 includes text strings (represented in FIG. 2 by the words ANY-TEXT), which may include any type of text, for example including letters, numbers, special characters and the like. The log enrichment components 130 may analyze the log 100 to determine whether the log 100 includes any text strings that match data patterns indicated in the pattern information 131 provided by customer 201. As shown in FIG. 2, the log 100 includes a text string $AB-1234-ZYX within log entry 104. In the example of FIG. 2, the log enrichment components 130 may detect that the text string $AB-1234-ZYX matches the data pattern $LL-NNNN-LLL that is identified within pattern information 131. Specifically, the text string $AB-1234-ZYX begins with a dollar sign ($), followed by two uppercase letters (AB), followed by a dash, followed by four numeric digits (1234), followed by another dash, followed by three uppercase letters (ZYX). Thus, the text string $AB-1234-ZYX matches the data pattern $LL-NNNN-LLL.

Upon matching the text string $AB-1234-ZYX to the data pattern $LL-NNNN-LLL, the log enrichment components 130 may then look-up the specified respective actions for data pattern $LL-NNNN-LLL that are indicated in action information 132. In the specific example of FIG. 2, there may be six specified respective actions for data pattern $LL-NNNN-LLL that are indicated in action information 132. These six actions include loading a resource information page for the respective resource, rebooting the respective resource, reducing a load on the respective resource (e.g., by disconnecting one or more entities that are accessing the respective resource and optionally redistributing those entities to other resources), allocating memory to the resource, allocating processing capabilities to the resource, and executing a serverless function associated with the resource. Such a serverless function could be customer defined and could take the log, or just the identified text string, as input. The serverless function may also link to other data sources that can be utilized to produce a result that can be displayed in response to performing the action. Additionally, the action information 132 may also indicate that each of these six actions should be presented to users via a drop-down menu 120. In some examples, the data pattern $LL-NNNN-LLL may be a format of a computing resource identifier that is defined by customer 201. Thus, the text string $AB-1234-ZYX may be an identifier for a given respective computing resource.

Accordingly, as shown in FIG. 2, when the log 100 is displayed to a user via log viewing application 105, the log 100 may be modified to include the drop-down menu 120 for resource $AB-1234-ZYX, which is displayed adjacent to the $AB-1234-ZYX text string. In some examples, the drop-down menu 120 may be displayed permanently (e.g., at all times that the log 100 is displayed) or may be displayed only when a user interacts with the $AB-1234-ZYX text string, such as when a cursor hovers on the text string, when the log is scrolled to a position associated with the text string (e.g., so that the text string is in the center of a display), and the like. As shown, the drop-down menu includes six menu options 111-116, which are each user-selectable to request performance of a corresponding action. Specifically, menu option 111 is selectable to load a resource information page for resource $AB-1234-ZYX, menu option 112 is selectable to reboot resource $AB-1234-ZYX, menu option 113 is selectable to reduce a load on resource $AB-1234-ZYX (e.g., by disconnecting one or more entities that are accessing the respective resource and optionally redistributing those entities to other resources), menu option 114 is selectable to allocate memory to resource $AB-1234-ZYX, menu option 115 is selectable to allocate processing capabilities to the resource $AB-1234-ZYX, and menu option 116 is selectable to execute a serverless function associated with the resource $AB-1234-ZYX. As should be appreciated, by displaying drop-down menu 120 within log 100 and log viewing application 105, thus user is able to request performance of each of the respective actions directly from within the log viewing application 105. In some examples, selection of any, or all, of the menu options 111-116 may cause additional applications and/or interfaces to be automatically opened on a user's computer to assist in performance of the respective actions. Also, in some examples, selection of any, or all, of the menu options 111-116 may cause the respective actions to be performed without opening any other additional applications and/or interfaces.

In some examples, in addition, or as an alternative, to being specified within the action information 132, one or more of the actions corresponding to menu options 111-116 may be determined based on data in the log 100. For example, in some cases, data within the log 100 may be analyzed by log enrichment components 130 to determine an error condition associated with the $AB-1234-ZYX computing resource, and the computer-executed actions may include one or more corrective actions that are employed to assist in resolving the error condition. For example, in some cases, one or more of the log entries 101-104 within the log 100 may indicate that the $AB-1234-ZYX computing resource is experiencing a high error rate, and some corrective actions for resolving or mitigating these errors may include rebooting the resource, reducing load on the resource, allocating additional memory and/or processing capabilities to the resource, and the like.

Figure 3:
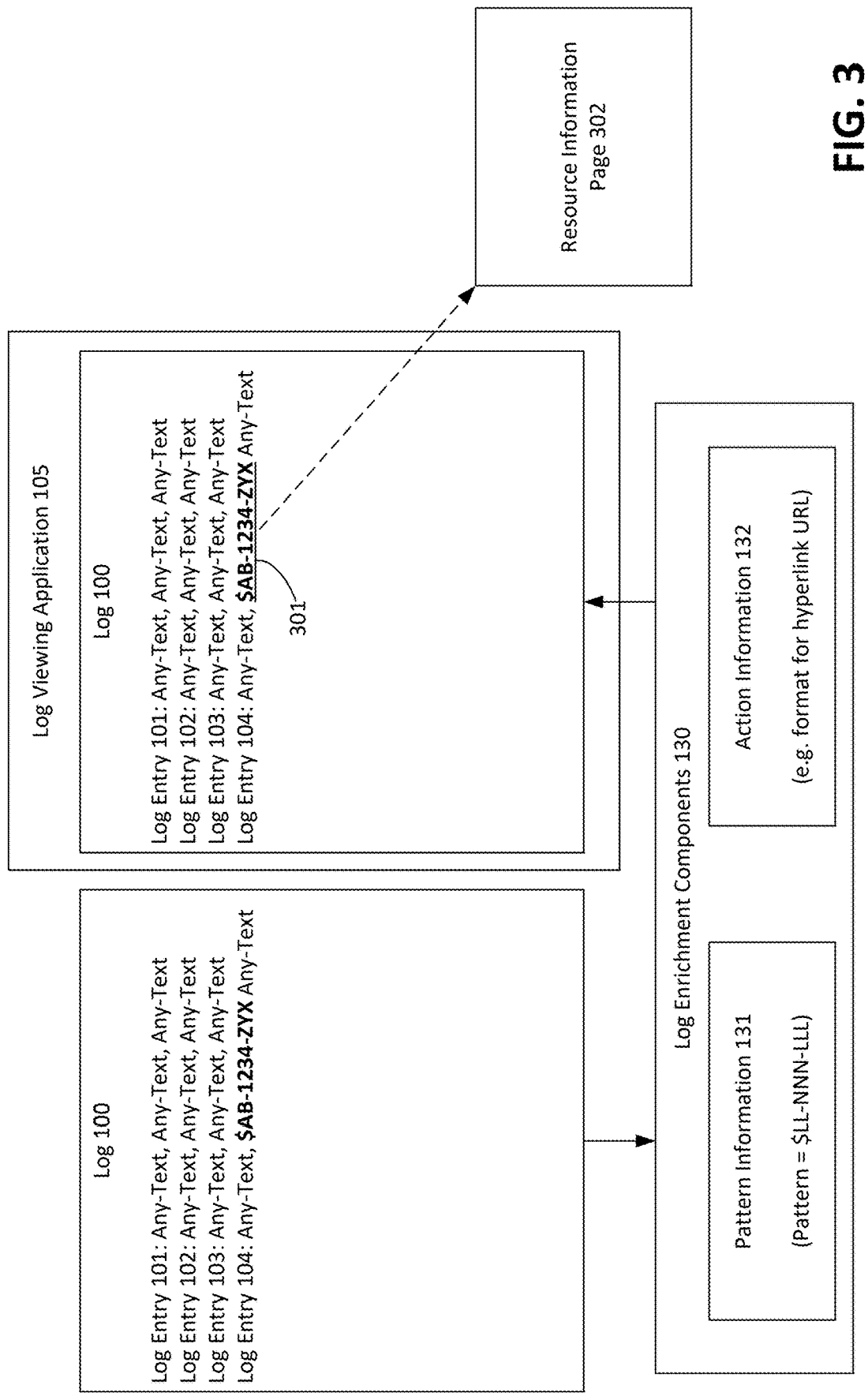
FIG. 3 is a diagram illustrating an example converted hyperlink for a matched log data pattern that may be used in accordance with the present disclosure.

Referring now to FIG. 3, an example is shown in which the $AB-1234-ZYX text string is converted into a hyperlink 301. As described above, in some examples, the action information 132 may indicate that, when the $LL-NNNN-LLL data pattern is detected, the monitoring service 210 may open a resource information page 302 for the corresponding resource. As indicated in FIG. 3, the action information 132 may also include a format for a URL that may be used to access the resource information page 302. In the example of FIG. 3, the action information 132 may further request that the detected text string corresponding to the $LL-NNNN-LLL data pattern will be converted to a hyperlink 301 that is displayed in the log 100 in order to allow a user to request opening of the resource information page 302. Based on these instructions within action information 132, upon detecting that the $AB-1234-ZYX text string matches the $LL-NNNN-LLL data pattern, the log enrichment components 130 may convert the $AB-1234-ZYX text string into hyperlink 301. As shown, when the user selects hyperlink 301, the resource information page may be loaded, such as by automatically opening a browser (or other page viewing application) and automatically inserting the URL into the address bar of the browser, in accordance with the URL formatting instructions provided in the action information 132.

Figure 4:
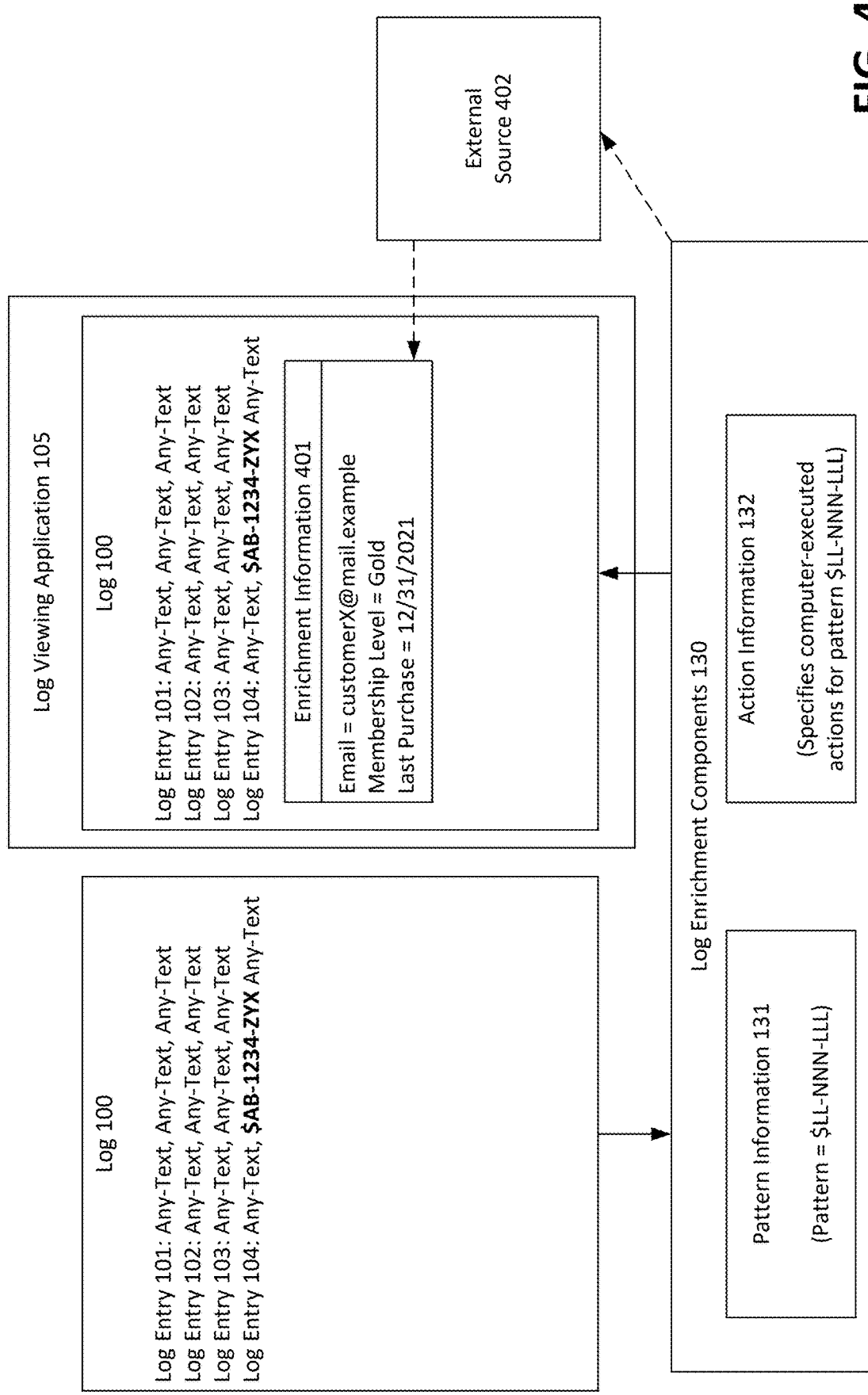
FIG. 4 is a diagram illustrating example data enrichment for a matched log data pattern that may be used in accordance with the present disclosure.

Referring now to FIG. 4, an example is shown in which information regarding a matched data pattern may be retrieved and added to the log 100. For example, in some cases, action information 132 may indicate that, upon detecting a text string within log 100 that matches the $LL-NNNN-LLL data pattern, the monitoring service 210 will access and retrieve information associated with the matched text string from an external source 402 (e.g., a database, information page, etc.), which is external to log 100. The action information 132 may further include instructions to display the retrieved information in log 100. Additionally, in some examples, the action information 132 may include a format for a URL or other address for the external source 402. As shown in FIG. 4, enrichment information 401 may be displayed in log 100 and/or log viewing application 105. In this example, the enrichment information 401 is displayed adjacent to the $AB-1234-ZYX text string. In some examples, the enrichment information 401 may be displayed permanently (e.g., at all times that the log 100 is displayed) or may be displayed only when a user interacts with the $AB-1234-ZYX text string, such as when a cursor hovers on the text string, when the log is scrolled to a position associated with the text string (e.g., so that the text string is in the center of a display), and the like.

In the example of FIG. 4, the $AB-1234-ZYX text string is an identifier for a given individual, such as an individual that purchases products from customer 201 via a membership. In this example, the enrichment information 401 includes data regarding this individual, such as the individual's email address, membership level, and last purchase date. In some examples, the enrichment information 401 may be saved in the log 100 and displayed not only to a current user that is currently viewing the log but also to additional users that may view the log subsequent to the current user, without requiring the enrichment information 401 to be repeatedly obtained and re-displayed. It is noted that the example data included in enrichment information 401 is merely a non-limiting example, and a wide variety of other types of information may be retrieved and displayed. It is further noted that the example enrichment techniques shown in FIGS. 2-4, such as including drop-down menu 120, hyperlink 301, and enrichment information 401, are not mutually exclusive techniques and may be used in combination with one another and/or other additional or alternative techniques.

Figure 5:
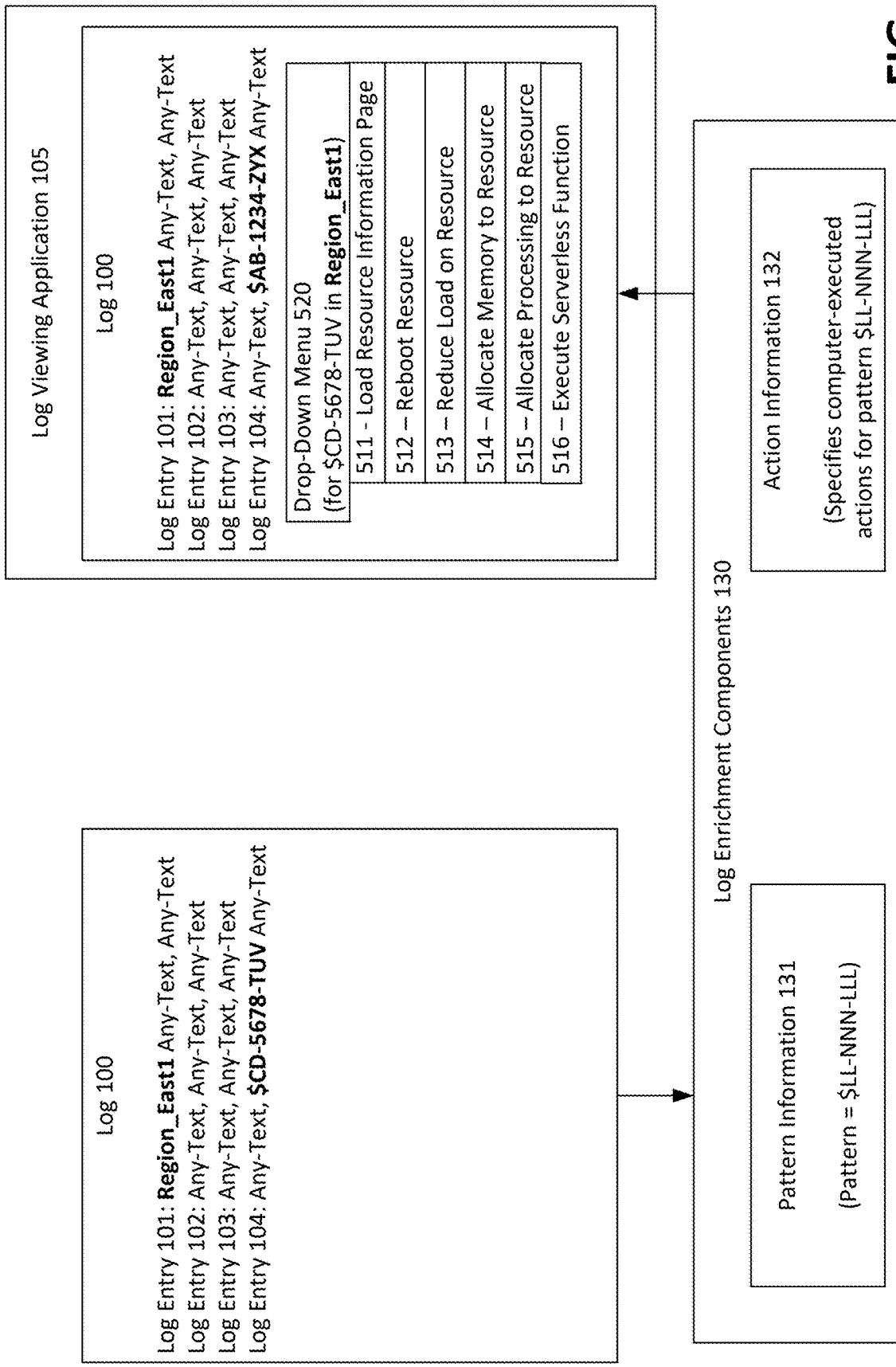
FIG. 5 is a diagram illustrating example log data pattern matching via secondary information that may be used in accordance with the present disclosure.

In some cases, in order to identify a particular entity associated with a matched text string, the monitoring service 210 may analyze additional data included in the same log entry as the matched text string, in another log entry from the same log, in a different log, and/or in other data sources. For example, in some cases, a given text string may match an identifier for a given computing resource. However, in some cases, there may be multiple resources in different computing regions that have the same identifier as one another, and it may be unclear which resource in which region is being referenced in the log. In some examples, the monitoring service may analyze the log to find additional information to identify the referenced resource. Referring now to FIG. 5, an example is shown in which a text string $CD-5678-TUV is matched to the $LL-NNN-LLL data pattern. In the example of FIG. 5, there are multiple resources in different regions that are assigned the $CD-5678-TUV identifier from the matched text string in log entry 104. Thus, based only on log entry 104, it may be unclear which $CD-5678-TUV resource in which region is being referenced in the log 100. However, in the example of FIG. 5, log enrichment components 130 may analyze other log entries (e.g., log entries 101-103) to attempt to determine which $CD-5678-TUV resource in which region is being referenced in the log 100. As shown in FIG. 5, log entry 101 includes the text string Region-_East1. Based on this text string in log entry 101, the log enrichment components 130 may conclude that the $CD-5678-TUV resource referenced in log entry 104 is located in Region_East1. In this scenario, the computer-executed actions may, therefore, be targeted to the particular $CD-5678-TUV resource in Region_East1 (e.g., as opposed to resources with the same identifier in other regions). For example, as shown in FIG. 5, a drop-down menu 520 is displayed for the $CD-5678-TUV resource in Region_East1. Specifically, in the example of FIG. 5, each of menu options 511-516 will cause actions to be performed in association with the $CD-5678-TUV resource in Region_East1. It is noted that there are a variety of other types of examples in which data obtained from one log entry may provide information regarding a matched text string in another log entry. In some specific example, data obtained from a first log entry may indicate a prefix for a name and/or identifier for a text string in a second log entry that is matched to data pattern.

Figure 6:
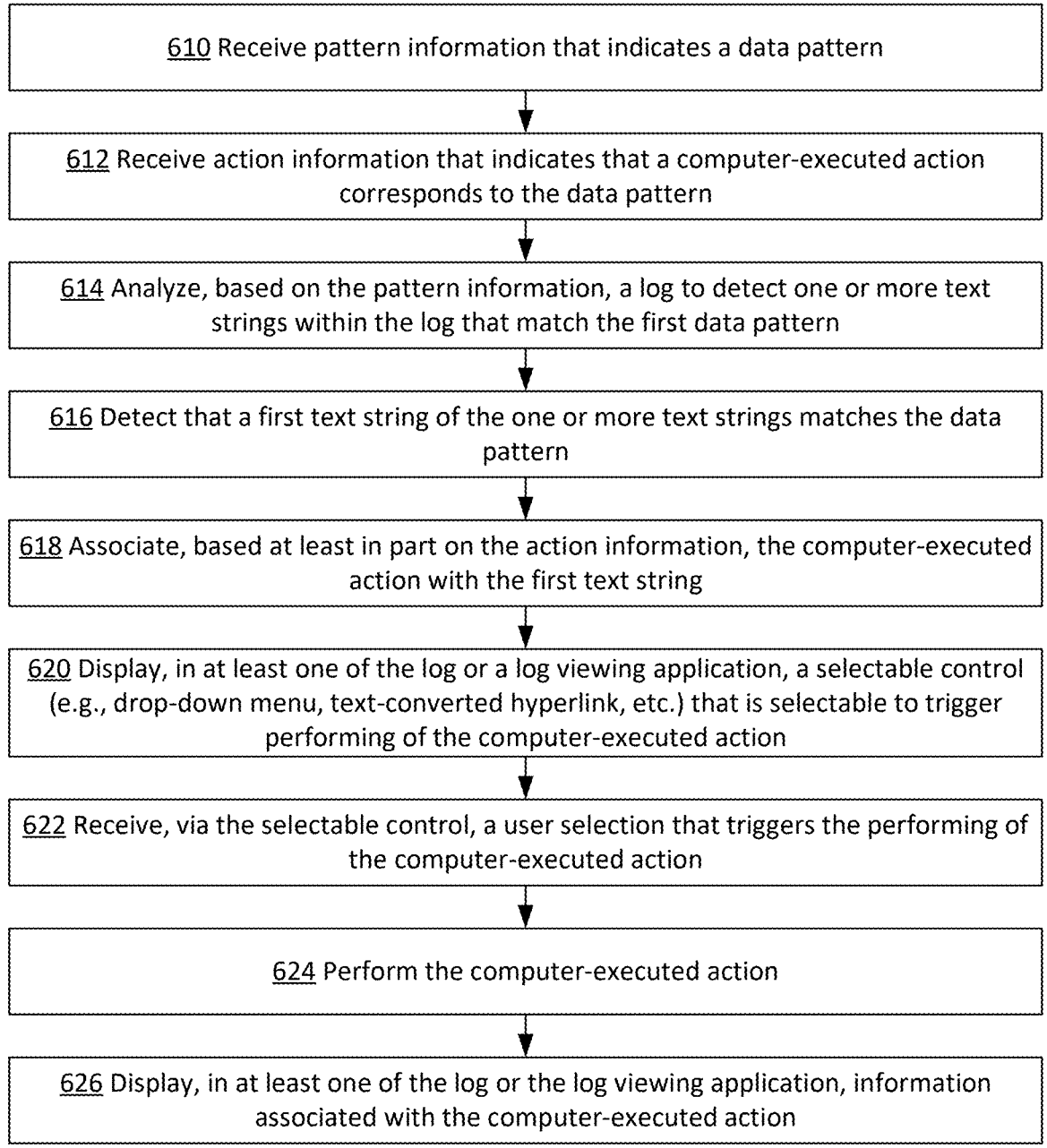
FIG. 6 is a flowchart illustrating an example log data pattern matching and action performance process that may be used in accordance with the present disclosure.

FIG. 6 is a flowchart illustrating an example log data pattern matching and action performance process that may be used in accordance with the present disclosure. In some examples, any, or all, of the operations 610-626 of FIG. 6 may be performed by a monitoring service 210, such as by log enrichment components 130 of monitoring service 210. The process of FIG. 6 is initiated at operation 610, at which pattern information (e.g., pattern information 131 of FIG. 1) is received that indicates a data pattern. As described above with reference to FIG. 1, pattern information 131 may be received, by monitoring service 210, from a customer 201 of the monitoring service 210. For example, the pattern information 131 may include a format of a respective pattern, such as a string length (e.g., specific length or length range), a type (e.g., letter, number, special character, etc.) and position of each character within the string, an indication of any spaces within the string, and the like. For example, for a given character, the pattern information may indicate whether a specific character (e.g., one or more specific letters) or a general character type (e.g., any letter) may be used, along with case information (e.g., upper case, lower case, not case-sensitive, etc.), and the like. In some examples, the pattern information 131 may be used to identify customer-specific patterns that are defined by customer 201 and used for customer-specific purposes. For example, customer 201 may use a specific identifier to identify various items that are managed by the customer 201, such as products, individuals, groups, departments, and the like. In many cases, prior to receipt of the pattern information 131 from customer 201, the monitoring service 210 may be unaware of the format of the customer-specific patterns identified within the pattern information 131 for customer 201. In some examples, the pattern information 131 may identify a plurality of data patterns. Receiving of pattern information from the customer may also include scenarios in which a customer provides user input (e.g., highlighting of a text string in a log and right-clicking, etc.) to select, from within a log, a text string for which a corresponding data pattern is to be added to the pattern information 131.

At operation 612, action information (e.g., action information 132 of FIG. 1) is received that indicates that a computer-executed action corresponds to the data pattern. The action information 132 may indicate that the computer-executed action is to be performed (and/or offered to be performed in response to user input) upon detection of the data pattern. In some examples, the action information 132 may indicate a plurality of actions that correspond to the data pattern—and that are to be performed (and/or offered to be performed in response to user input) upon detection of the data pattern. Moreover, in some examples, when the pattern information 131 indicates a plurality of data patterns, the action information 132 may indicate one or more respective actions that correspond to each data pattern indicated in the pattern information 131—and that are to be performed (and/or offered to be performed in response to user input) upon detection of each data pattern. As described above, in some examples, the computer-executed action may be suggested to a customer of the monitoring service based on a machine learning algorithm that analyzes customer actions in association with viewing of logs.

In some examples, the action information 132 may indicate customer-specific actions that are defined by customer 201 and used for customer-specific purposes. Some example computer-executed actions may include accessing a resource associated with a given data pattern, such as a data store or information page associated with a given data pattern. For example, the action information may include a customer-defined format of a URL or other address of the specified resource. The computer-executed actions may also include retrieving information from the accessed resource and displaying the information in a log. The computer-executed actions may also include other actions that may be performed on a resource associated with a given data pattern, such as an invocation of a serverless or other computing function. Furthermore, in some examples, the action information 132 may indicate whether a specified action should be performed automatically (e.g., without requesting user input) or in response to user input. For scenarios in which an action is performed based on user input, the action information 132 may also indicate a type of selectable control (e.g., drop-down menu, hyperlink, etc.) via which the user input may be provided. For example, in some cases, for scenarios in which the specified action includes accessing a resource associated with a detected pattern, the text string that includes the detected pattern may be converted to a hyperlink. Clicking-on, or otherwise selecting, the hyperlink may cause the specified resource (e.g., a page or other location associated with the detected pattern) to be accessed, such as via a URL or other address indicated in the action information. In other examples, a drop-down menu may be displayed in the log and/or log viewing application, such as at a location adjacent to the detected pattern. The drop-down menu may indicate respective actions, which are specified in the action information, that may be performed in association with the detected pattern.

At operation 614, a log is analyzed, based on the pattern information, to detect one or more text strings within the log that match the data pattern. Operation 614 may include identifying text strings within the log, such as within log entries, and attempting to match each identified text string with the data pattern, such as by comparing the contents of the text string to the specified characteristics of the data pattern (as indicated in the pattern information). For example, this may include comparing (e.g., attempting to match) individual characters of the text string to character types (e.g., letters, numbers, special characters, etc.) indicated in the specified characteristics of the data pattern. This may also include comparing (e.g., attempting to match) other characteristics of the text string and the data pattern, such as string length, case sensitivity, and the like. In some examples, when the pattern information indicates a plurality of data patterns, the monitoring components may compare each identified text string in the log to each of the plurality of data patterns to attempt to find matches.

At operation 616, it is detected (e.g., based on the analyzing of operation 614) that a first text string of the one or more text strings matches the data pattern. For example, operation 616 may include determining and confirming that all the specified characteristics of the data pattern (as indicated in the pattern information) are satisfied by the text string. This may include determining and confirming that character types (e.g., letters, numbers, special characters, etc.) indicated in the specified characteristics of the data pattern are satisfied by the characters of the text string. This may also include determining and confirming that other characteristics of the text string, such as string length, case sensitivity, and the like, are satisfied by the text string.

At operation 618, the computer-executed action is associated with the first text string based at least in part on the action information. For example, upon detecting that the first text string matches the specified data pattern, the monitoring service may then access the action information to determine which action(s) correspond to the specified data pattern. For scenarios in which there are a plurality of specified data patterns, the monitoring service may access a specific portion of the action information that corresponds to, and indicates respective action(s) for, the specific data pattern to which the text string was matched. As described above, the action information indicates that the computer-executed action corresponds to the data pattern. Because the computer-executed action corresponds to the data pattern, and because the data pattern is matched to the text string, the monitoring components may conclude that the computer-executed action also corresponds to the text string. Based on this correspondence, the monitoring components may associate the computer-executed action with the text string. In some examples, the monitoring components may maintain is list or other data collection that indicates which text strings within the log are associated with which computer-executed actions. Additionally, in some examples, operation 618 may include creating and storing a record within this data collection that indicates that the computer-executed action is associated with the first text string. This data collection may then be analyzed, such as to determine which for which text strings selectable controls (e.g., drop-down menus and hyperlinks) should be displayed in the log and/or for which text strings additional information should be retrieved and displayed.

As described above, in some examples, the first text string may be included in a first log entry, and the computer-executed action may be associated with the first text string further based in part on data from one or more other log entries. FIG. 5 shows an example in which a text string $CD-5678-TUV is matched to the $LL-NNN-LLL data pattern. In the example of FIG. 5, there are multiple resources in different regions that are assigned the $CD-5678-TUV identifier from the matched text string in log entry 104. Thus, based only on log entry 104, it may be unclear which $CD-5678-TUV resource in which region is being referenced in the log 100. However, in the example of FIG. 5, log enrichment components 130 may analyze other log entries (e.g., log entries 101-103) to attempt to determine which $CD-5678-TUV resource in which region is being referenced in the log 100. As shown in FIG. 5, log entry 101 includes the text string Region_East1. Based on this text string in log entry 101, the log enrichment components 130 may conclude that the $CD-5678-TUV resource referenced in log entry 104 is located in Region_East1. In this scenario, the computer-executed actions may, therefore, be targeted to the particular $CD-5678-TUV resource in Region_East1 (e.g., as opposed to resources with the same identifier in other regions). For example, as shown in FIG. 5, a drop-down menu 520 is displayed for the $CD-5678-TUV resource in Region_East1. Specifically, in the example of FIG. 5, selection of each of menu options 511-516 may trigger actions to be performed in association with the $CD-5678-TUV resource in Region_East1.

At operation 620, a selectable control is displayed, in at least one of the log or a log viewing application that displays the log, that is selectable to trigger the performing of the computer-executed action. In some examples, the selectable control may be a drop-down menu. In some examples, the selectable control may be displayed adjacent to a text string with which the computer-executed action is associated, for example as determined based on a data collection that associates computer-executed actions with text strings. For example, as shown in FIG. 2, when the log 100 is displayed to a user via log viewing application 105, the log 100 may be modified to include the drop-down menu 120 for resource $AB-1234-ZYX, which is displayed adjacent to the $AB-1234-ZYX text string. In some examples, the drop-down menu 120 may be displayed permanently (e.g., at all times that the log 100 is displayed) or may be displayed only when a user interacts with the $AB-1234-ZYX text string, such as when a cursor hovers on the text string, when the log is scrolled to a position associated with the text string (e.g., so that the text string is in the center of a display), and the like. As shown, the drop-down menu 120 includes six menu options 111-116, which are each user-selectable to request performance of a corresponding action. Specifically, menu option 111 is selectable to load a resource information page for resource $AB-1234-ZYX, menu option 112 is selectable to reboot resource $AB-1234-ZYX, menu option 113 is selectable to reduce a load on resource $AB-1234-ZYX (e.g., by disconnecting one or more entities that are accessing the respective resource and optionally redistributing those entities to other resources), menu option 114 is selectable to allocate memory to resource $AB-1234-ZYX, menu option 115 is selectable to allocate processing capabilities to the resource $AB-1234-ZYX, and menu option 116 is selectable to execute a serverless function associated with the resource $AB-1234-ZYX.

In some examples, the selectable control may be a hyperlink. For example, the text string with which the computer-executed is associated (e.g., the first text string) may be converted to the hyperlink, for example as determined based on a data collection that associates computer-executed actions with text strings. For example, as shown in FIG. 3, the $AB-1234-ZYX text string may be converted into a hyperlink 301. As described above, in some examples, the action information 132 may indicate that, when the $LL-NNNN-LLL data pattern is detected, the monitoring service 210 may open a resource information page 302 for the corresponding resource. As indicated in FIG. 3, the action information 132 may also include a format for a URL that may be used to access the resource information page 302. In the example of FIG. 3, the action information 132 may further request that the detected text string corresponding to the $LL-NNNN-LLL data pattern will be converted a hyperlink 301 that is displayed in the log 100 order to allow a user to request opening of the resource information page 302. Based on these instructions within action information 132, upon detecting that the $AB-1234-ZYX text string matches the $LL-NNNN-LLL data pattern, the log enrichment components 130 may convert the $AB-1234-ZYX text string into hyperlink 301.

At operation 622, a user selection that triggers the performing of the computer-executed action is received via the selectable control. At operation 624, the computer-executed action is performed. For example, as described above, the selection of any of menu options 111-116 from drop-down menu 120 of FIG. 2 may trigger the respective computer-executed actions to be performed. In some examples, in response to the user selection received via the selectable control (e.g., drop-down menu 120 of FIG. 2, hyperlink 391 of FIG. 3, etc.), the monitoring service 210 may cause the computer-executed action to be performed. For example, the computer-executed action may be performed by the monitoring service 210 and/or by one or more other services or components. In scenarios when the computer-executed action is performed by the monitoring service 210, the monitoring service 210 may cause the computer-executed action to be performed, such as by performing one or more operations that constitute the computer-executed action. In scenarios when the computer-executed action is performed by one or more other services or components, the monitoring service 210 may cause the computer-executed action to be performed, such as by sending instructions to the one or more other services or components to perform the computer-executed action, or otherwise triggering the one or more other services or components to perform the computer-executed action. As also described above, when the user selects hyperlink 301 of FIG. 3, the resource information page may be loaded, such as by automatically opening a browser (or other page viewing application) and automatically inserting the URL into the address bar of the browser, in accordance with the URL formatting instructions provided in the action information 132. As described above, the computer-executed action may be performed on one or more computing resources of a customer associated with the log (e.g., customer 201 of FIG. 1). As also described above, an error condition associated with the one or more computing resources may be determined based on the log, and the computer-executed action may relate to correction of the error condition. For example, in some cases, one or more of the log entries 101-104 within the log 100 may indicate that the $AB-1234-ZYX computing resource is experiencing a high error rate, and some corrective actions for resolving or mitigating these errors may include rebooting the resource, reducing load on the resource, allocating additional memory and/or processing capabilities to the resource, and the like.

At operation 626, information associated with the computer-executed action is displayed in at least one of the log or the log viewing application. For example, in some cases, the computer-executed action may include obtaining, from a source external to the log, additional information and providing the additional information to a user. For example, as shown in FIG. 4, the action information 132 may indicate that, upon detecting a text string within log 100 that matches the $LL-NNNN-LLL data pattern, the monitoring service 210 will access and retrieve information associated with the matched text string from an external source 402 (e.g., a database, information page, etc.), which is external to log 100. The action information 132 may further include instructions to display the retrieved information in log 100. As shown in FIG. 4, enrichment information 401 may be displayed in log 100 and/or log viewing application 105. In the example of FIG. 4, the $AB-1234-ZYX text string is an identifier for a given individual, such as an individual that purchases products from customer 201 via a membership. In this example, the enrichment information 401 includes data regarding this individual, such as the individual's email address, membership level, and last purchase date. In some examples, the enrichment information 401 may be saved in the log 100 and displayed not only to a current user that is currently viewing the log but also to additional users that may view the log subsequent to the current user, without requiring the enrichment information 401 to be repeatedly obtained and re-displayed. The information associated with the computer-executed action (e.g., enrichment information 401), may be displayed adjacent to the text string with which the computer-executed action is associated (e.g., the $AB-1234-ZYX text string), for example as determined based on a data collection that associates computer-executed actions with text strings. In another example, the computer-executed action may be a serverless function defined by the customer, and operation 626 may include displaying a result of the serverless function in response to the serverless function being performed. The result of the serverless function may be displayed in at least one of the log or the log viewing application.

Figure 7:
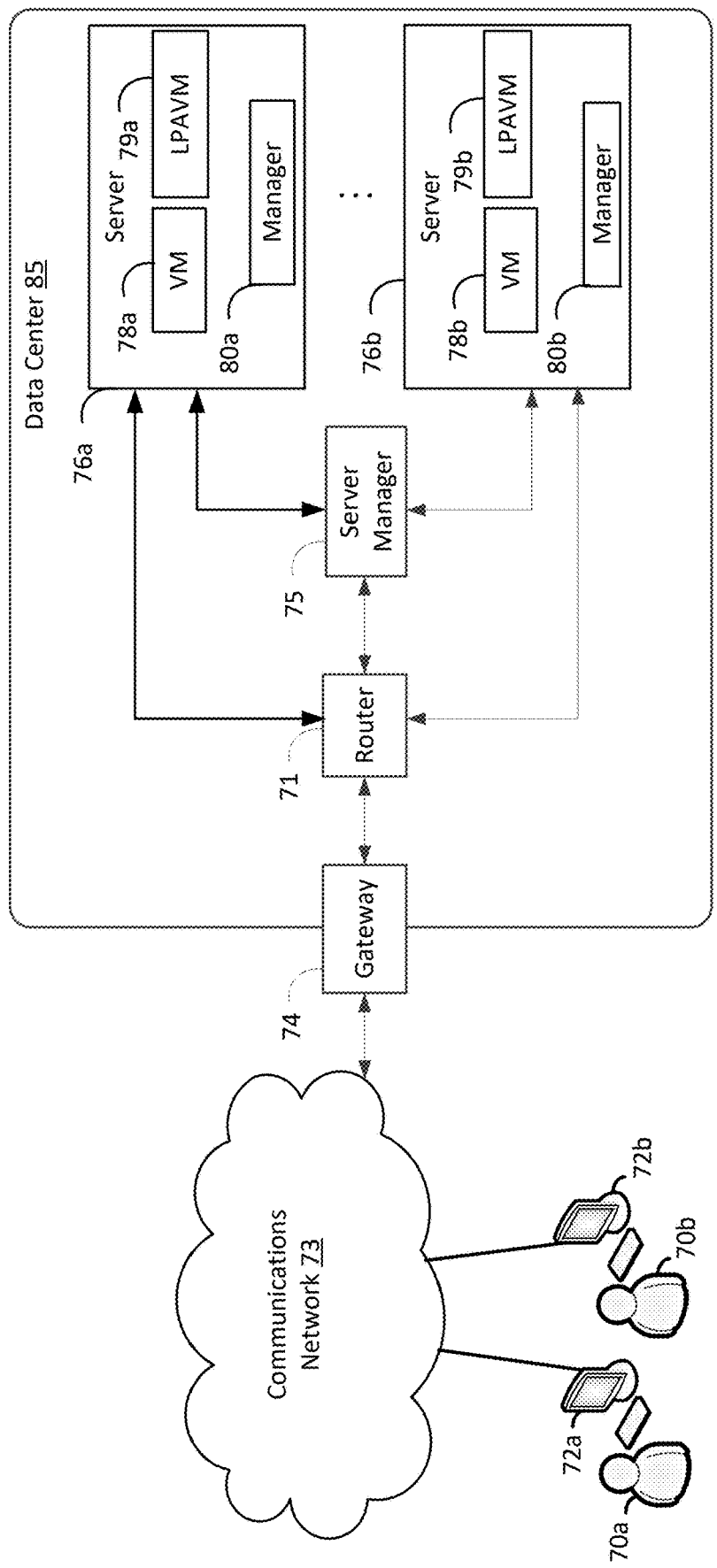
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include log pattern action virtual machines (LPAVM's) 79a-b, which are virtual machines that are configured to execute any, or all, of the techniques described above, such as including, but not limited to, detection of data patterns within logs and performance of computer-executed actions based on the detection of the data patterns.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API)

exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76*a* and 76*b*. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
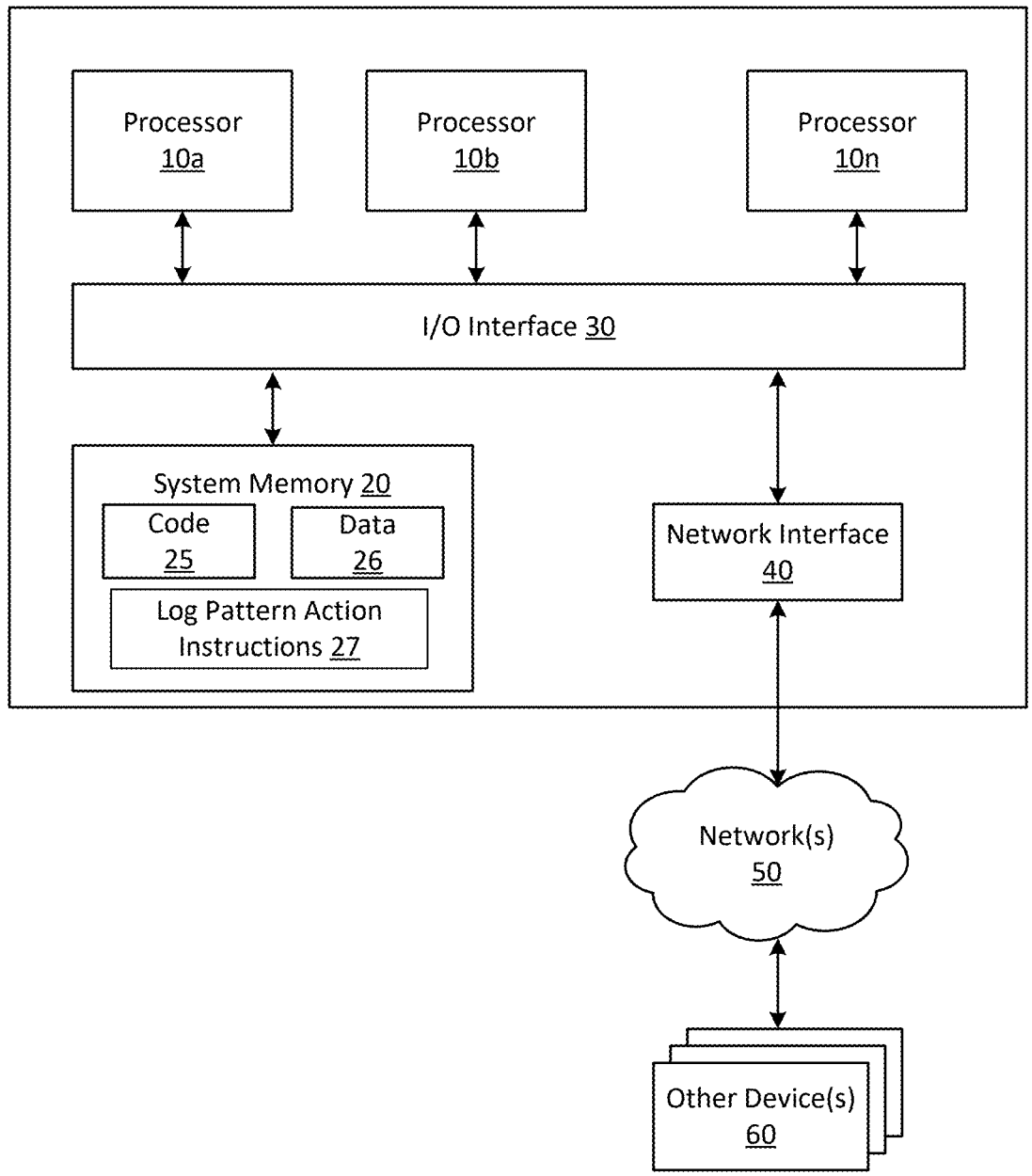
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes log pattern action instructions 27, which are instructions for executing any, or all, of the techniques described above, such as including, but not limited to, detection of data patterns within logs and performance of computer-executed actions based on the detection of the data patterns.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform operations comprising:
receiving, by a monitoring service, from a customer of the monitoring service, pattern information that indicates a data pattern;
receiving, by the monitoring service, from the customer, action information that indicates that a first computer-executed action corresponds to the data pattern;
analyzing, by the monitoring service, based on the pattern information, a log to detect one or more text strings within the log that match the data pattern;
detecting, by the monitoring service, based on the analyzing, that a text string of the one or more text strings matches the data pattern;
associating, by the monitoring service, based at least in part on the action information, the first computer-executed action with the text string;
inserting, in the log, a selectable control that displays a plurality of selectable options corresponding to a plurality of computer-executed actions including the first computer-executed action, wherein the inserting of the selectable control in the log allows performance of the plurality of computer-executed actions directly from within a log viewing application that displays the log, wherein a first selectable option of the plurality of selectable options is selectable to trigger performance of the first computer-executed action, and wherein the log has a plurality of log entries and comprises data regarding events associated with a plurality of computing resources;
receiving, via the first selectable option of the selectable control, a user selection that triggers the performance of the first computer-executed action; and
performing the first computer-executed action.

2. The computing system of claim 1, wherein the first computer-executed action is a serverless function defined by the customer, and wherein the operations further comprise:
displaying a result of the serverless function in response to the serverless function being performed.

3. The computing system of claim 1, wherein the text string is included in a first log entry, and wherein the first computer-executed action is associated with the text string further based in part on data from one or more other log entries.

4. The computing system of claim 1, wherein the first computer-executed action comprises obtaining, from a source external to the log, additional information and providing the additional information to the user.

5. The computing system of claim 1 wherein the selectable control is a drop-down menu.

6. The computing system of claim 1, wherein the first computer-executed action is performed on one or more computing resources of the plurality of computing resources.

7. The computing system of claim 6, wherein the operations further comprise:
determining, based on the log, an error condition associated with the one or more computing resources, wherein the first computer-executed action relates to correction of the error condition.

8. A computer-implemented method comprising:
receiving, by a monitoring service, from a customer of the monitoring service, pattern information that indicates a data pattern;
receiving, by the monitoring service, from the customer, action information that indicates that a first computer-executed action corresponds to the data pattern;
analyzing, by the monitoring service, based on the pattern information, a log to detect one or more text strings within the log that match the data pattern;
detecting, by the monitoring service, based on the analyzing, that a text string of the one or more text strings matches the data pattern;
associating, by the monitoring service, based at least in part on the action information, the first computer-executed action with the text string;
inserting, in the log, a selectable control that displays a plurality of selectable options corresponding to a plurality of computer-executed actions including the first computer-executed action, wherein the inserting of the selectable control in the log allows a user to request performance of the plurality of computer-executed actions directly from within a log viewing application that displays the log, wherein a first selectable option of the plurality of selectable options is selectable to trigger performance of the first computer-executed action, and wherein the log has a plurality of log entries and comprises data regarding events associated with a plurality of computing resources;
receiving, via the first selectable option of the selectable control, a user selection that triggers the performance of the first computer-executed action; and
causing, by the monitoring service, the first computer-executed action to be performed.

9. The computer-implemented method of claim 8, wherein the selectable control is a drop-down menu.

10. The computer-implemented method of claim 8, wherein the first computer-executed action is performed on one or more computing resources of the plurality of computing resources.

11. The computer-implemented method of claim 10, further comprising:
determining, based on the log, an error condition associated with the one or more computing resources, wherein the first computer-executed action relates to correction of the error condition.

12. The computer-implemented method of claim 8, wherein the first computer-executed action comprises obtaining, from a source external to the log, additional information and providing the additional information to the user.

13. The computer-implemented method of claim 8, wherein the text string is included in a first log entry, and wherein the first computer-executed action is associated with the text string further based in part on data from one or more other log entries.

14. The computer-implemented method of claim 8, wherein the first computer-executed action is suggested to a customer of the monitoring service based on a machine learning algorithm that analyzes customer actions in association with viewing of logs.

15. One or more non-transitory computer-readable storage media having stored thereon computing instructions that, upon execution by one or more computing devices, cause the one or more computing devices to perform operations comprising:

analyzing, by a monitoring service, based on pattern information that indicates a data pattern, a log to detect one or more text strings within the log that match the data pattern;

detecting, by the monitoring service, based on the analyzing, that a text string of the one or more text strings matches the data pattern;

associating, by the monitoring service, based at least in part on action information that indicates that a first computer-executed action corresponds to the data pattern, the first computer-executed action with the text string;

inserting, in the log, a selectable control that displays a plurality of selectable options corresponding to a plurality of computer-executed actions including the first computer-executed action, wherein the inserting of the selectable control in the log allows a user to request performance of the plurality of computer-executed actions directly from within a log viewing application that displays the log, wherein a first selectable option of the plurality of selectable options is selectable to trigger performance of the first computer-executed action, and wherein the log has a plurality of log entries and comprises data regarding events associated with a plurality of computing resources;

receiving, via the first selectable option of the selectable control, a user selection that triggers the performance of the first computer-executed action; and causing, by the monitoring service, the first computer-executed action to be performed.

16. The one or more non-transitory computer-readable storage media of claim 15, wherein the selectable control is a drop-down menu.

17. The one or more non-transitory computer-readable storage media of claim 15, wherein the first computer-executed action comprises obtaining, from a source external to the log, additional information and providing the additional information to the user.

18. The one or more non-transitory computer-readable storage media of claim 15, wherein the operations further comprise:

receiving, by the monitoring service, from a customer of the monitoring service, the pattern information.

19. The one or more non-transitory computer-readable storage media of claim 15, wherein the operations further comprise:

receiving, by the monitoring service, from a customer of the monitoring service, the action information.

20. The one or more non-transitory computer-readable storage media of claim 15, wherein the first computer-executed action is performed on one or more computing resources of the plurality of computing resources.

* * * * *